United States Patent
Ochiai

(10) Patent No.: US 8,707,021 B2
(45) Date of Patent: Apr. 22, 2014

(54) DATA RECORDING DEVICE, DATA RECORDING METHOD TO BE USED IN SAME, AND DATA RECORD CONTROLLING COMPUTER PROGRAM

(75) Inventor: Katsuhiro Ochiai, Tokyo (JP)

(73) Assignee: NEC Corporation, Tokyo (JP)

( * ) Notice: Subject to any disclaimer, the term of this patent is extended or adjusted under 35 U.S.C. 154(b) by 244 days.

(21) Appl. No.: 12/919,450

(22) PCT Filed: Feb. 27, 2009

(86) PCT No.: PCT/JP2009/053761
§ 371 (c)(1),
(2), (4) Date: Aug. 25, 2010

(87) PCT Pub. No.: WO2009/107809
PCT Pub. Date: Sep. 3, 2009

(65) Prior Publication Data
US 2011/0010537 A1    Jan. 13, 2011

(30) Foreign Application Priority Data

Feb. 27, 2008    (JP) .................................. 2008-046673

(51) Int. Cl.
*H04L 9/00* (2006.01)
*H04N 9/80* (2006.01)

(52) U.S. Cl.
USPC ........... 713/150; 386/201; 386/240; 386/250; 386/296; 386/299

(58) Field of Classification Search
USPC ........... 386/296, 201, 240, 250, 299; 713/150
See application file for complete search history.

(56) References Cited

U.S. PATENT DOCUMENTS

| 2004/0103434 A1* | 5/2004 | Ellis ................................. 725/58 |
| 2006/0136718 A1* | 6/2006 | Moreillon ..................... 713/155 |
| 2009/0046988 A1* | 2/2009 | Kenagy ........................... 386/83 |

FOREIGN PATENT DOCUMENTS

| JP | 2001160256 A | 6/2001 |
| JP | 2002084525 A | 3/2002 |
| JP | 2004166189 A | 6/2004 |
| JP | 2006019998 A | 1/2006 |
| JP | 2006074392 A | 3/2006 |

* cited by examiner

Primary Examiner — William Powers
(74) Attorney, Agent, or Firm — Sughrue Mion, PLLC

(57) ABSTRACT

A data recording device is provided to record and redistribute stream data such as TV programs without imposing loads proportional to the number of users. Stream data of a distributed program is collated by a recording range judging section 4 with data already recorded of a stream data recording section 6 and, based on results from the collation, only newly distributed data is appended to the stream data recording section. Recording demand information representing a range of stream data of a program that a user makes a request for recording is recorded in a range recording section 5 and a user identifier to identify the user is recorded in a manner to be associated with the above recording demand range information. Stream data only in a range corresponding to the above recording demand range information of the user recorded by the above demand range recording processing is read out by a redistributing section 7 from the stream data recording section 6 and is redistributed to the user.

11 Claims, 8 Drawing Sheets

DATA RECORDING DEVICE, DATA RECORDING METHOD TO BE USED IN SAME, AND DATA RECORD CONTROLLING COMPUTER PROGRAM

This application is the National Phase of PCT/JP2009/053761, filed Feb. 27, 2009, which is based upon and claims priority from Japanese Patent Application No. 2008-046673 filed Feb. 27, 2008.

TECHNICAL FIELD

The present invention relates to a data recording device, a data recording method to be used in the data recording device, and a data record controlling computer program, and more particularly to the data recording device that can be suitably used for recording program data made up of voice data and/or video data employed in, for example, such as digital broadcast and/or IPTV (Internet TV) service, the data recording method to be used in the data recording device, and the data record controlling computer program.

BACKGROUND TECHNOLOGY

As a recording method for recording program data made up of voice data and/or video data, generally, following three types of methods are available.
1. A method in which a user performs video recording using a video recording means (for example, video recorder).
2. A method in which a distributing source records and manages video data in such a case of video-on-demand service.
3. A method in which an image storing means (for example, cache) is provided between a distributing source and video recording terminal to record video data in stead of the video recording terminal such as in the case of nDVR (Network Digital Video Recorder).

As related art of this kind, for example, a multimedia data managing device is disclosed in a related-art Patent Reference 1. In the multimedia data managing device, after a program is received, video data is stored in every file of a user who has made a first request for recording. Any program that a second user and his/her followers have made a request for recording is stored at the time when the video recording is performed, in a shared file and then by deleting the program that the first user has recorded, it is made possible to reduce storage capacity even when a same program is recorded by a plurality of users.

Patent Reference 1: Japanese Patent Application Laid-open No. 2004-166189
Patent Reference 2: Japanese Patent Application Laid-open No. 2006-019998
Patent Reference 3: Japanese Patent Application Laid-open No. 2001-160256
Patent Reference 4: Japanese Patent Application Laid-open No. 2002-084525
Patent Reference 5: Japanese Patent Application Laid-open No. 2006-074392

DISCLOSURE OF THE INVENTION

Problems to be Solved by the Invention

However, the above related art presents following problems. That is, the multimedia data managing device disclosed in the related-art Patent Reference 1 has a problem in that processing of file sharing cannot be carried out before receiving of the file is completed. In ordinary cases, in order to finish the receipt, as a file, of a program having a predetermined time length such as a TV program, it is necessary to wait for the ending of the program itself. Therefore, in the above multimedia data managing device, in the case of files to be received in real time such as a TV program, there is a time lag before actual file sharing is carried out and, when a second user or his/her followers perform video recording at the same time, temporary storage of the file is required for every user. After that, identification is judged, which causes another time lag before file sharing operation is started. Therefore, during a period of time while these time lags occur, the start of file sharing is impossible and, before the file sharing is carried out, it is necessary to prepare recording capacity to store all files for every individual user.

Moreover, the related-art Patent Reference 1 has no descriptions as to whether every stored file is permitted to be distributed to a corresponding user as to which user made a video recording. It is therefore presumed that a user having made a video recording reservation is recorded at the very time when the video recording reservation is made. As a result, when the video recording reservation of one program is fragmentarily made for every user, even if a method of divided storage disclosed in the related-art Patent Reference 1 is employed, the range of individual video recording reservation (that is, what frames corresponding to the lapse of time after commencement of a program are to be reserved for video recording) is not made clear at the time of the file sharing and the authority to control the watching/listening to the program connected by the divided storage only for a range of being reserved for video recording is not exactly guaranteed. Out of programs actually received, some pieces of video data are encrypted. In the related-art Patent Reference 1, there is no clear description about this point and also no description about how encrypted data is accumulated, stored, and/or transcoded for data transfer and, as a result, such a technology disclosed in the related-art Patent Reference 1 is effective only for non-decrypted programs. Moreover, the related-art Patent Reference 2 discloses a technology in which a program data collating and recording means is provided to collate distributed program data with data already recorded in a program data recording means and, based on results from the collation, only the newly distributed program data is appended to the program data recording means. However, in the technology disclosed in the related-art Patent Reference 2, "an object to be collated with the data already recorded" is one entire video program and, when a small piece of one video program is recorded, there is no description about a means to prevent repeating video recording of a same small piece within one program. Also, the related-art Patent Reference 3 discloses a technology in which recording demand range information representing a range of program data that a user makes a request for recording and user information to identify a user is associated with the recording demand range information. However, the technology disclosed in the related-art Patent Reference 3 is to be used for identification of the user and cannot be used for judging as to whether the user has an authority to watch/listen to a program at time of redistribution (there is no description about this). Also, the related-art Patent Reference 4 discloses a technology describing plainly the installation of a "redistribution means". However, as in the case of the related-art Patent Reference 3, a recording range specified by each user is not used as an effective range of watching/listening to a program at the time of redistribution (there is no description about this). Furthermore, the related-art Patent Reference 5 discloses a technology in which a "decrypting means" is provided to decrypt, when stream data recorded by a program data recording means is encrypted, the stream data is decrypted by a given decryption key. However, if a plurality of users makes a request for recording a same range of a program and when each program data to be decrypted is to be encrypted by a different decryption key, decryption using a decryption key in advance at time of recording is required. Therefore, the technology disclosed in the related-art Patent Reference 5 has a problem. That is, though other users to whom other decryption keys have been assigned make a request for decryption at the time of watching and listening of a program, a different decryption key is originally assigned to each user at time of encryption and, therefore, it is impossible to decrypt the range in which other users have started the recording.

The present invention is designed with respect to the above problems and has an object to provide the data recording device to record and redistribute stream data such as program data of TV broadcast without imposing loads proportional to the number of users on recording units including a storage device or the like and to exactly redistribute data only in a recording range set at time of video recording and/or audio recording reservation by a user and also to exactly record or redistribute a program even if its video data is encrypted, a data recording method to be used in the above data recording device, and a data record controlling computer program.

Means for Solving Problem

To solve the above problems, a first aspect of the present invention is characterized in that a data recording device having a program data recording unit for recording program data to be distributed through a network in the program data recording unit is made up of a program data collating and appending unit to collate distributed program data with recorded data already recorded in the program data recording unit and to append, based on results from the collation, only newly distributed data to the program data recording unit and a demand range recording unit to record recording demand range information representing a range of said program data that a user makes a request for recording and to record user information to identify said user in a manner to be associated with said record demand range information, the user information which is used, at time of redistribution, for judging as to whether or not the user has an authority to watch/listen to said range of said program data, and wherein said program data collating and appending unit appends only the chopped portion in which no recording range is duplicated, out of program data newly distributed, to said program data recording unit. Also, the data recording device is characterized in that a redistributing unit is appended which reads out, from the program data recording unit, program data as a range which the user has the authority to watch/listen to, only in a range corresponding to the recording demand range information of the user being recorded in the demand range recording unit and to redistribute the read-out program data to the user.

A second aspect of the present invention is characterized in that a data recording method to be used in a data recording unit having a program data recording unit for recording program data to be distributed through a network in the program data recording unit which includes program data collating and appending processing of collating distributed program data already recorded in the data recording unit and of appending, based on results from collation, only newly distributed program data to the program data recording unit and demand range recording processing of recording record demand range information representing a range of the program data that a user makes a request for recording and of recording user information to identify the user in a manner to be associated with the record demand range information, the user information which is used, at time of redistribution, for judging as to whether or not the user has an authority to watch/listen to said range of said program data, and wherein, in said program data collating and appending processing, only the chopped portion in which no recording range is duplicated, out of program data newly distributed, is appended to said program data recording unit. The data recording method is characterized also by having a redistributing processing of reading out, from the program data recording unit, program data as a range which the user has the authority to watch/listen to, only in a range corresponding to the recording demand range information of the user already recorded by the demand range recording processing and of redistributing the program data to the user.

Effects of the Invention

According to the configurations of the present invention, distributed program data is collated, by the program data collating and appending unit, with data already recorded in a program data recording unit and, based on results from the collation, only newly distributed program data (that is, recording ranges of a video program do not overlap in a chopped portion (small piece) thereof, only the chopped portion within newly distributed program data) is appended to the program data recording unit and recording demand range information representing a range of program data that a user makes a request for recording is recorded by the demand range recording unit and user information to identify the user in a manner to be associated with the above recording demand range information (more in detail, the information is also used, at time of redistribution) for judging as to whether or not the user has the authority to watching and/or listening to a program). That is, even when one video program is recorded on a small piece basis, double recording of the small piece within one video program can be prevented.

Figure 1:
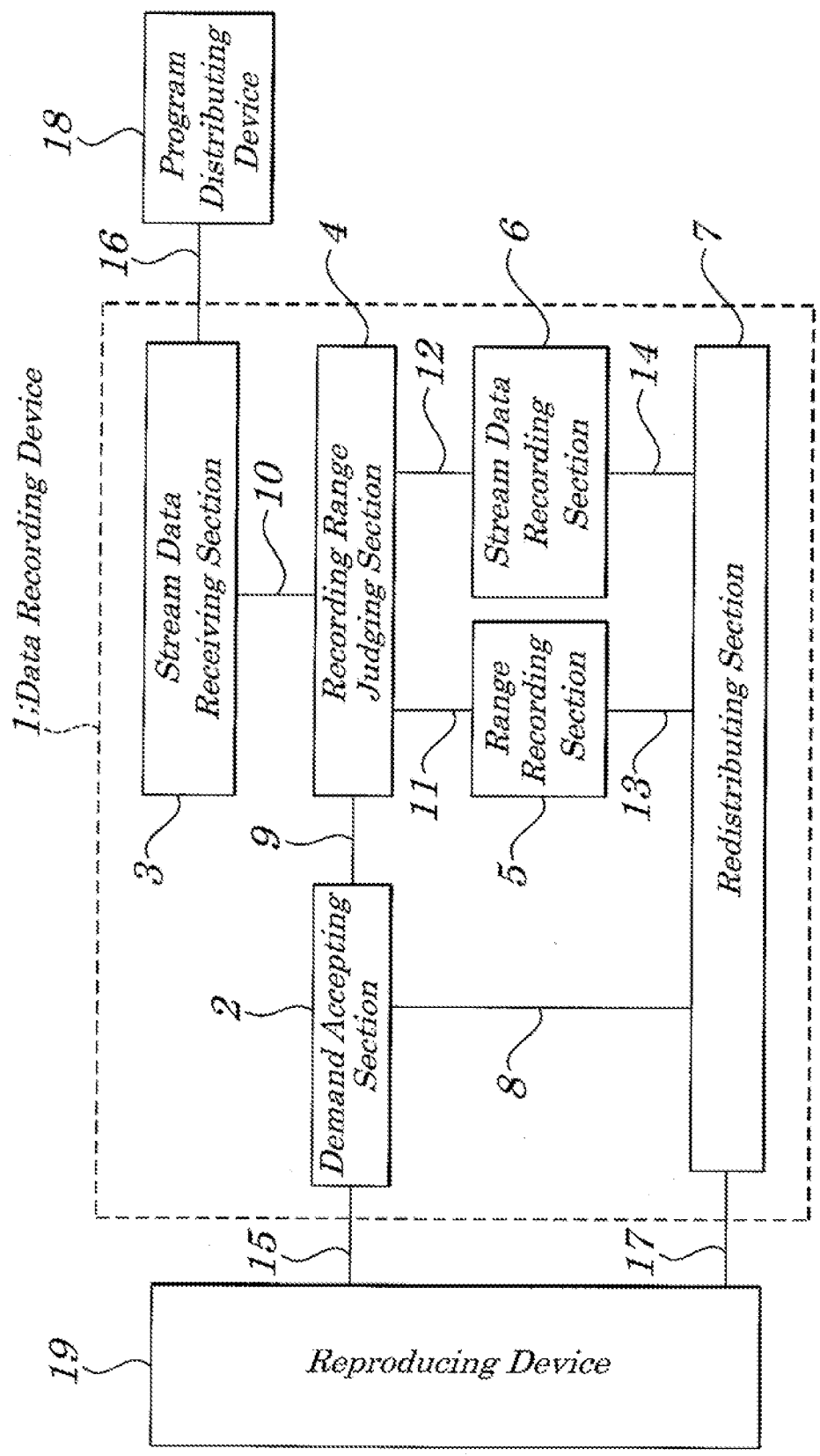
FIG. 1 is a block diagram showing electrical configurations of main components of a data recording device according to a first exemplary embodiment of the present invention.

EXPLANATION OF CHARACTERS 1, 1A: Data recording device
1a: CPU (Central Processing Unit) (part of computer and data recording unit)
1b: ROM (Read Only Memory) (part of computer and data recording unit)
2: Demand accepting section (part of data recording device)
3: Stream data receiving section (part of data recording device)
4: Recording range judging section (part of program data collating and appending means)
5: Range recording section (demand range recording means)
6: Stream data recording section (program data recording means)
7: Redistributing section (redistributing means)
7A: Redistributing section (redistributing means, decrypted data collating and appending means)
21: Decrypting section (decrypting means)
23: Decrypted stream data recording section (decrypted data recording means)
25: Transcoding section (part of data recording device)
27: Decryption range recording section (decryption range recording means)
31: Network video recorder (data recording device)
31a: CPU (part of computer and data recording device)
31b: ROM (part of computer and data recording device)
32: Demand accepting module (part of data recording device)
33: IP (Internet protocol) broadcast program receiving module (part of data recording device)
34: Recording range judging module (part of program data collating and appending means)
35: Range recording DB (database) (demand range recording means)
36: Stream data recording DB (program data recording means)
37: Redistributing module (redistributing means)
51: Decrypting module (decrypting means)
53: Decrypted stream data recording DB (decrypted data recording means)
55: Transcoding module (part of data recording device)
57: Decryption range recording DB (decryption range recording means)

BEST MODE OF CARRYING OUT THE INVENTION

The object of the present invention is realized by providing a program data collating/appending means in which a data recording device collates distributed stream data of a program with data already recorded in a program data recording means and, based on results from the collation, appends only newly distributed program data to the program data recording means and a demand range recording means in which recording demand range information representing the range of stream data of the above program that a user makes a request for recording is recorded and in which user information used to identify the user is recorded in a manner to be associated with the recording demand range information.

In an exemplary embodiment of the present invention, a redistributing means to read out only stream data within the range corresponding to the record demand range information of a user recorded in the demand range recording means from the program data recording means is preferably added. Moreover, it is preferable that, a decrypting means in which, when the stream data is encrypted, the stream data is decrypted with a given decryption key, a decrypted data recording means to record the decrypted data decrypted by the decrypting means, and a decrypting data collating/appending means to collate reproduction demand range information with the record demand range information of a user recorded in the demand range recording means and, based on results from the collation, appends only the newly decrypted data to the above decrypted data recording means are additionally provided.

Moreover, it is also preferable to additionally provide a redistribution means to read out only decrypted data within the range corresponding to reproduction demand range information from the decrypted data recording means and to redistribute the data to the user. It is further preferable to additionally provide a decrypting range recording means to provide the decryption key to the decrypting means and to record the range of data decrypted by the decrypting means in a manner to be associated with the decrypted data.

First Exemplary Embodiment

FIG. 1 is a block diagram showing electrical configurations of main components of a data recording device according to a first exemplary embodiment of the present invention. The data recording device 1 of the exemplary embodiment has a CPU (Central Processing Unit) 1a serving as a computer to control the entire data recording device 1 and a ROM (Read Only Memory) 1b which stores a data recording control program to operate the CPU 1a. According to the exemplary embodiment in particular, the data recording device 1 is made up of a demand accepting section 2, a stream data receiving section 3, a recording range judging section 4, the range recording section 5, a stream data recording section 6, and a redistributing section 7. The demand accepting section 2 is connected through a communication path 8 to the redistributing section 7 and also through a communication path 9 to the recording range judging section 4.

The stream data receiving section 3 is connected through a communication path 10 to the recording range judging section 4. The recording range judging section 4 is connected through a communication path 11 to the range recording section 5 and also through a communication path 12 to the stream data recording section 6. The range recording section 5 is connected through a communication path 13 to the redistributing section 7 and the stream data recoding section 6 is connected through a communication path 14 to the redistributing section 7. The data recording device 1 is connected through communication paths 15 and 17 to a reproducing device 19 and also through a communication path 16 to a program distributing device 18. Moreover, the communication by each of the above communication paths 8, . . . , 17 is realized, in some cases, not by actual communication operations but also by procedural connecting relations including the receipt and transmission of data among programs which can achieve operations of each section.

The program distributing device 18 is so configured as to supply stream data (program data) of a program made up of voice data and/or video data to be distributed via a network to the data recording device 1. The stream data receiving section 3 receives stream data of the distributed program. The stream data recording section 6 records stream data of a program. The reproducing device 19 has a function of reproducing a program and outputs information about a record demand range information representing the range of stream data of a program that the user makes a request for recording. The demand accepting section 2 accepts information about the record demand range information to be outputted from the reproducing device 19. The recording range judging section 4, when the demand accepting section 2 accepts the above record demand range information, collates recorded data already recorded in the stream data recording section 6 with recorded data and, based on results from the collation, appends to the stream data recording section 6. Here, the recording range judging section 4 has a function to append only the chopped portion in which no recording range is duplicated, out of program data newly distributed, to the stream data recording section 6. The range recording section 5 records the above record demand range information and a user identifier (user information) to identify the user in a manner to be associated with the above record demand range information (more in detail, the user information is also used, at time of redistribution, for judging as to whether or not the user has the authority to watch/listen to a video/audio program). The redistributing section 7 reads out from the stream data recording section 6 only stream data within the range corresponding to the record demand range information of the above user being recorded in the range recording section 5 and redistributes the stream data to the reproducing device 19.

Figure 2:
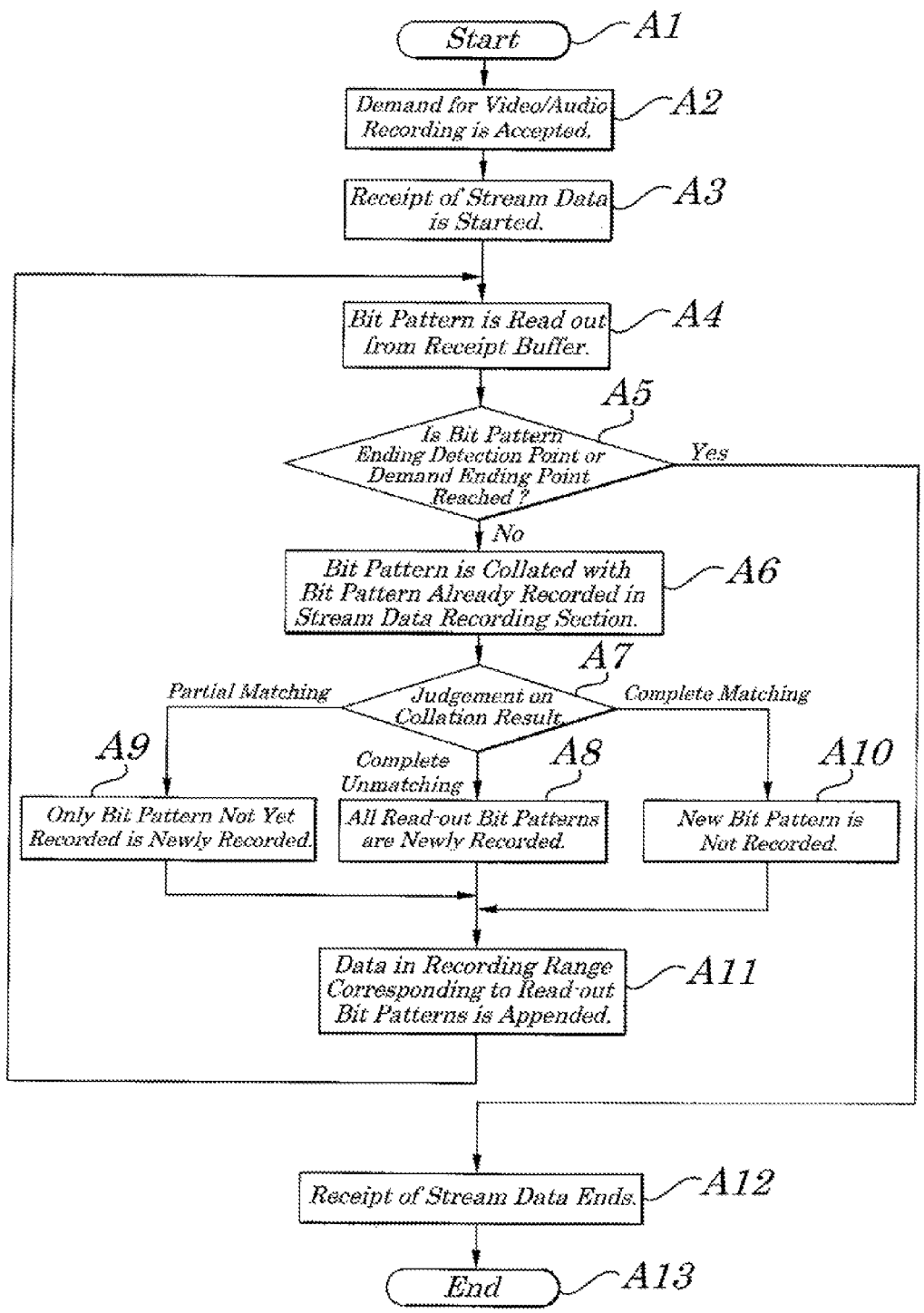
FIG. 2 is a flow chart explaining operations in video/audio recording mode of the data recording device 1 shown in FIG. 1.
Figure 3:
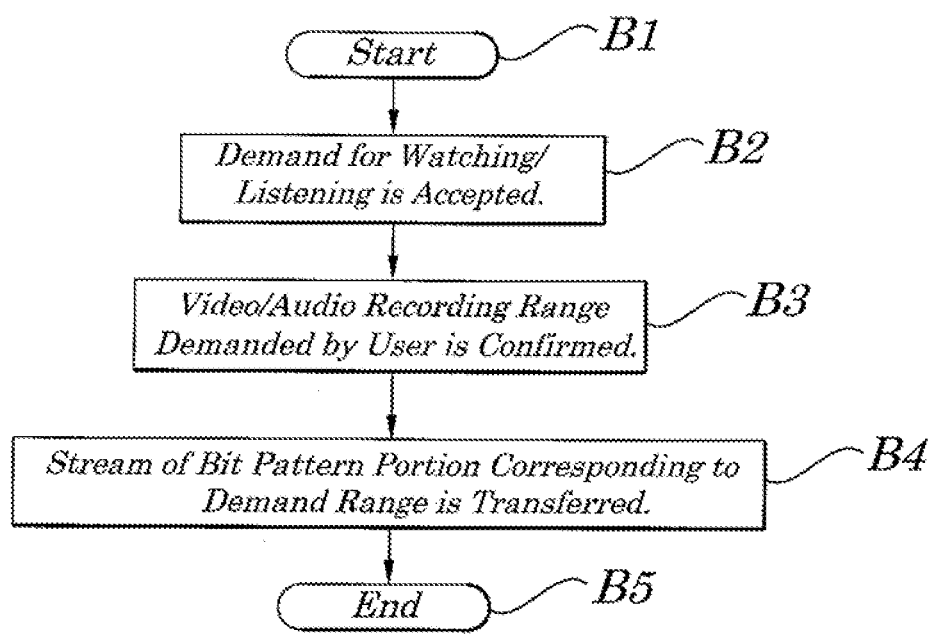
FIG. 3 is a flow chart explaining operations in watching/listening mode of the data recording device 1.

FIG. 2 is a flow chart explaining operations in video/audio recording mode of the data recording device 1 shown in FIG. 1. FIG. 3 is a flow chart explaining operations in watching/listening mode of the data recording device 1. By referring to these drawings, contents of processing for the data recording method to be used in the data recording device of the exemplary embodiment is explained. In the data recording device 1, the distributed stream data of a program is collated by the recording range judging section 4 with the data already recorded in the stream data recording section 6 and, based on results from the collation, only the newly distributed data is appended to the stream data recording section 6 (program data collating and appending processing). Then, in the range recording section 5, the record demand range information representing the range of stream data of a program that a user makes a request for recording is recorded and the user identifier to identify the user is recorded in a manner to be associated with the above record demand range information (demand range recording processing). In the redistributing section 7, only stream data in the range corresponding to the record demand range information of the above user being recorded by the above demand range recording processing is read out from the stream data recording section 6 and is redistributed to the user (redistributing processing).

That is, at the time of video recording and/or audio recording, as shown in FIG. 2, when operations are started (Step A1), the demand from the reproducing device 19 for video and/or audio recording of a specified program is accepted by the demand accepting section 2 and this demand is transferred to the recording range judging section 4 (Step A2). The recording range judging section 4 starts to receive (Step A3), through the stream data receiving section 3, the demanded program as stream data from the program distributing device 18. Then, in the recording range judging section 4, a newly received specific amount of data (which is called a "bit pattern" in the exemplary embodiment in particular) out of stream data the receipt of which has been started as above is read out from an unillustrated receiving buffer in the stream data receiving section 3 (Step A4). Next, if neither a bit pattern end detecting point nor demand ending point is reached (Step A5), in the recording range judging section 4, the read-out bit pattern is compared with a previous program already recorded in the stream data recording section 6 (Steps A6 and A7) and, when there exists no partial matching therebetween, all the read-out bit patterns are newly recorded in the stream data recording section 6 (Step A8).

On the other hand, if the read-out bit pattern partially matches the previous program already recorded in the stream data recording section 6, only the bit pattern having no matched portion is extracted and only the extracted portion is newly appended to the stream data recording section 6 (Step A9, program data collating appending processing). Also, in the Step A7, if the read-out bit pattern fully matches the previous program already recorded in the stream data recording section 6, no pattern is not recorded newly in the stream data recording section 6 (Step A10).

When processing in the Steps A8, A9, or A10 is terminated, data in a recording range corresponding to bit patterns read out from the above receiving buffer is recorded, as a record of video/audio recording performed by a user, in the range recording section 5 in a manner to be associated with the user identifier to identify the user (Step A11, demand range recording processing). The processes in the Steps A4 to A11 are repeated (Step A5) until ending of bit patterns to be read out is detected (program end) or the ending point (time or frame) for the predetermined range of the video/audio recording is reached and, if conditions are satisfied, the receiving of the stream data is terminated (Step A12) and operations end (Step A13).

Moreover, at the time of watching and listening, as shown in FIG. 3, when operations starts (Step B1), the demand accepting section 2 accepts the watching and listening of a specific program in the reproducing device 19 (Step B2) and this demand is transferred to the redistributing section 7. In the redistributing section 7, based on the recorded content stored in the range recording section 5, the range of video/audio recording of the program demanded by the user is confirmed (Step B3) and only the processing of reproducing demand in the corresponding range is accepted and the stream of the bit patterns corresponding to the demand range is transferred to the reproducing device 19 (Step B4). In the case when the range of demand for watching and listening accepted in the Step B2 is out of the range of the demand for video/audio recording having been confirmed in the Step B3, the program is not distributed (Step B4). If part of the recorded program is within the range of demand for the watching/listening, only the corresponding part is redistributed in the Step B4 and operations end (Step B5).

When the demand accepting section 2 accepts demand for deletion of the recorded video/audio program from the reproducing device 19, information about the recording range of the accepted program is deleted. At this time, if there exist no other duplicated users contained in the recording range, the bit pattern of the program within the range is deleted from the stream data recording section 6. Moreover, when encrypted stream data of a program is to be decrypted by the reproducing device 19, the data recording device 1 does not need special additional functions and, internally, the stream data is handled as ordinary stream data. Moreover, the range recording section 5 and stream data recording section 6 can operate in parallel and the flow of video/audio recording and the flow of watching/listening are performed in a parallel manner. Therefore, the demand for watching/listening is accepted by the demand accepting section 2 before the ending of the video/audio recording, the stream data of a program is sequentially recorded in every receiving buffer in the stream data recording section 6 and stream data is read out, in accordance with the number of bits corresponding to a delay in the receiving buffer, by the redistributing section 7 from the stream data recording section 6 and is redistributed.

Thus, in the first exemplary embodiment, the distributed stream data of a program is collated by the recording range judging section 4 with the data recorded, in the stream data recording section 6 and, based on results from the collation, only the newly distributed data is appended to the stream data recording section 6 and, in the range recording section 5, the above demand range information representing the range of stream data of the program that a user makes a request for recording and a user identifier to identify the user is recorded in a manner to be associated with the above record demand range information and only the stream data within the range corresponding to the above record demand range information of the user recorded by the above demand range recording processing is read out by the redistributing section 7 from the stream data recording section 6 and is distributed to the user and, therefore, the stream-type program such as TV broadcasting is recorded without duplicated portions and load being proportional to the number of users is not imposed on the stream data recording section 6 and only the stream data falling within the recording range set by the user is accurately recorded and redistributed. Moreover, the right of possessing the program and range of the program can be managed by every user.

Second Exemplary Embodiment

Figure 4:
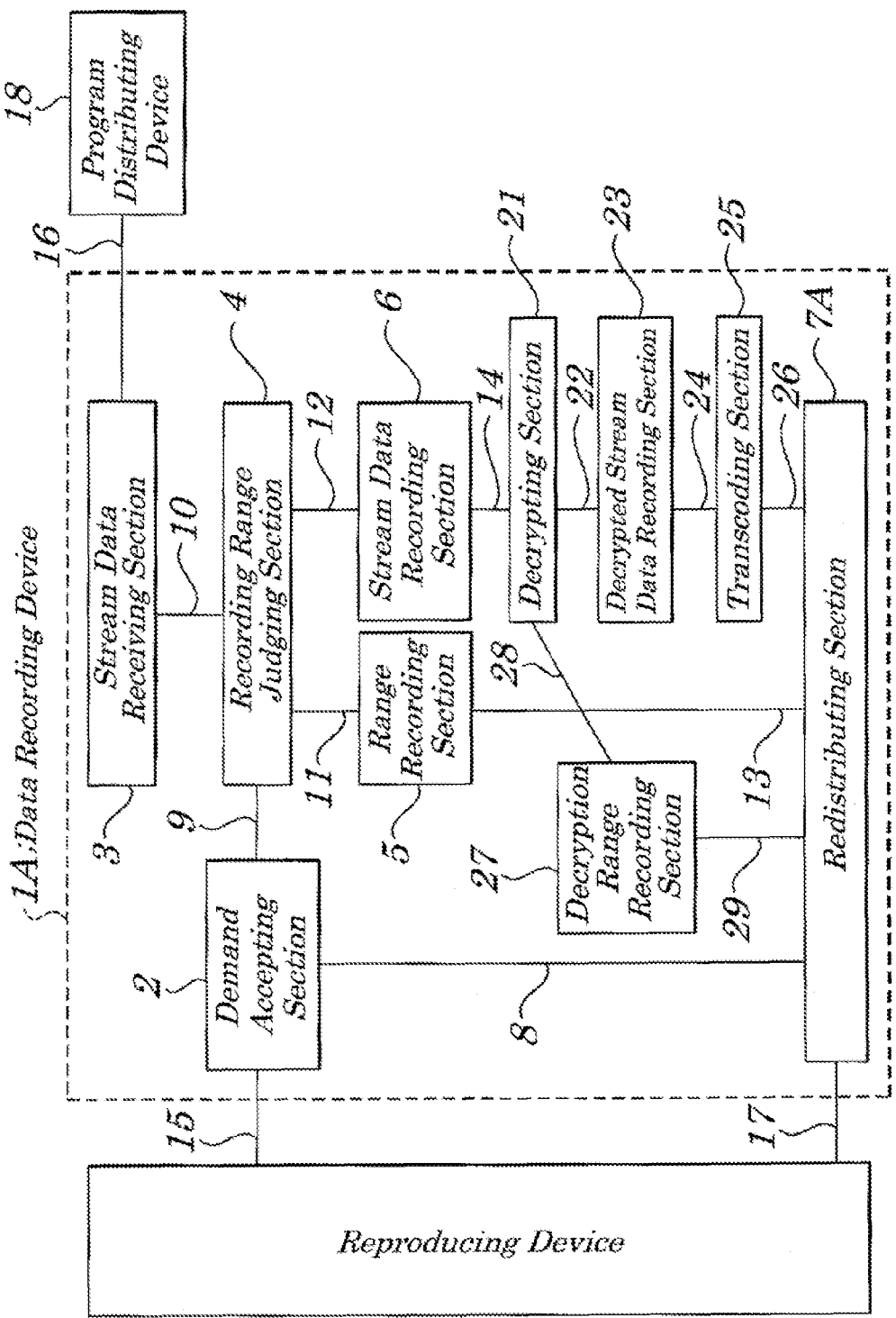
FIG. 4 is a block diagram showing electrical configurations of main components of a data recording device according to a second exemplary embodiment of the present invention.

FIG. 4 is a block diagram showing electrical configurations of main components of a data recording device according to a second exemplary embodiment of the present invention. In FIG. 4, same reference numbers are assigned to components being the same as those shown in FIG. 1 (first exemplary embodiment) and their descriptions are omitted or simplified accordingly. The data recording device 1A of the second exemplary embodiment, as shown in FIG. 4, has a redistributing section 7A to which new functions are added, instead of the redistributing section 7 in FIG. 1 and also has a decrypting section 21, a communication path 22, a decrypted stream data recording section 23, a communication path 24, a transcoding section 25, a communication path 26, a decryption range recording section 27, and communication paths 28 and 29. The decrypting section 21, when the stream data being recorded in a stream data recording section 6 is encrypted, decrypts the stream data with a given decryption key. The decrypted stream data recording section 23 records the data decrypted by the decrypting section 21.

The transcoding section 25, by using a reproducing device 19, transcodes the encrypted stream data being recorded in the decrypted stream data recording section 23 to a reproducible format. The redistributing section 7A collates the reproduction demand range information representing the range of the stream data of a program that a user makes a request for recording with record demand range information of the user being recorded in a range recording section 5 and, based on results from the collation, appends only the newly decrypted data to the decrypted stream data recording section 23. Also, the redistributing section 7A reads out only the decrypted stream data within the range corresponding to the above reproduction demand range information from the decrypted stream data recording section 23 and redistributes the read-out data to the reproducing device 19 of the user. The decryption range, recording section 27 provides a decryption key to the decrypting section 21 and records the range of the stream data decrypted by the decrypting section 21 in a manner to be associated with the decrypted stream data. The configurations other than above are the same as those shown in FIG. 1. The data recording device 1A performs the same processing as for the data recording device 1 at the time of video/audio recording.

Figure 5:
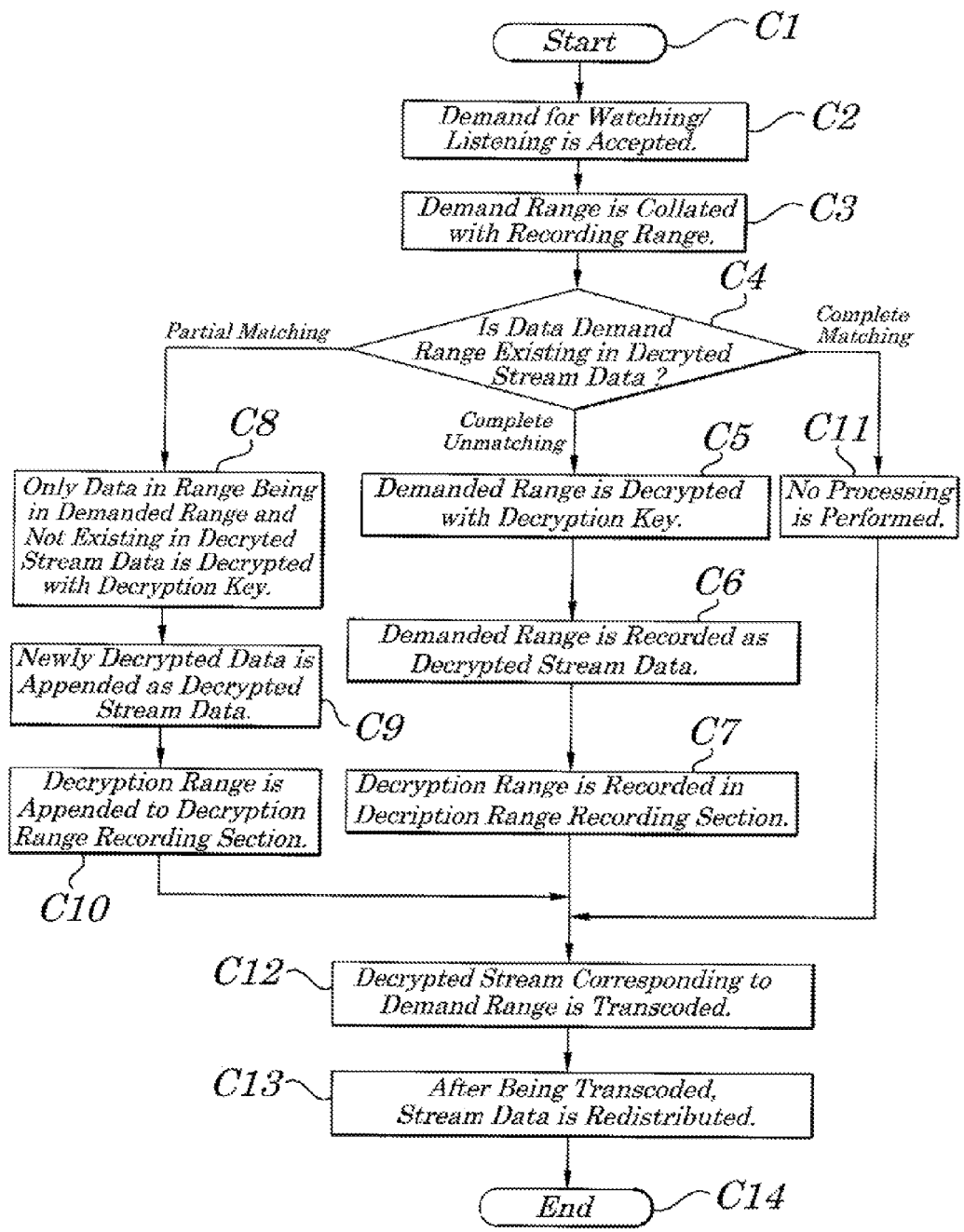
FIG. 5 is a flow chart explaining operations in watching/listening mode of the data recording device 1A shown in FIG. 4.

FIG. 5 is a flow chart explaining operations in watching/listening mode of the data recording device 1A shown in FIG. 4. By referring to the drawing, contents of processing for data recording method to be used in the data recording device of the exemplary embodiment are described. In the data recording device 1A, the reproduction demand range information representing the range of stream data of a program that the user makes a request for reproduction is collated by the redistributing section 7A with the record demand range information of the user being recorded by the demand range recording processing (Step A11 in FIG. 2) and, based on results from the collation, only the newly decrypted data is appended to the decrypted stream data recording section 23 (decrypted data collating and appending processing). Also, only the decrypted stream data within the range corresponding to the above reproduction demand range information is read out by the redistributing section 7A from the decrypted stream data recording section 23 and is redistributed to the user (redistributing processing). Furthermore, the decryption key is provided by the decryption range recording section 27 to the decrypting section 21 and the range of the decrypted stream data is recorded in a manner to be associated with the data (decryption range recording processing).

That is, at time of watching/listening, as shown in FIG. 5, when operations start (Step C1), the demand for watching/listening to a specified program is accepted through the reproducing device 19 by the demand accepting section 2 and the demand is transferred to the redistributing section 7A (Step C2). In the redistributing section 7A, based on recorded contents of the range recording section 5, the watching/listening to the program for which the user of the reproducing device 19 makes a request is confirmed (Step C3) and the processing for the reproduction demand of only the corresponding range is accepted and succeeding processes are then performed. The demand limited to the range accepted in the Step C3 is called a demand range. If there is complete matching between the demand range and range of video/audio recording, its original demand range is kept unchanged as it is and, if there is partial matching therebetween, demand range is reduced to a matched range. On the other hand, if there is no complete matching, the case is, handled as no demand range and following processing is not performed.

The redistributing section 7A makes an inquiry of the range recording section 5 to check as to whether there is a demand range in decrypted stream data stored in the decrypted stream data recording section 23 (Step C4). In the Step C4, if there is no decrypted stream data in the demand range (no complete matching), the stream data in the demand range is obtained by the decrypting section 21 from the stream data recording section 6 and the decryption key is obtained from the decryption range recording section 27 for decryption (Step C5). The decrypted data is once stored in the decrypted stream data recording section 23 (Step C6) and the decrypted range is recorded in the decryption range recording section 27 in a manner to be associated with the decrypted stream data (Step C7).

In the Step C4, if there is partially the decrypted stream data of the demand range (partial matching), only the non-decrypted range is newly decrypted (Step C8) by the decrypting section 21 and the range is appended to the decrypted stream data recording section 23 (Step C9). Then, the newly decrypted range is appended to the decryption range recording section 27 (Step C10). In the Step C4, if a demand range is fully contained in the decrypted stream data (complete matching), no processing is performed in this processing (Step C11). Next, the decrypted stream data corresponding to the demand range is transcoded by the transcoding section 25 to a format being reproducible in the reproducing device (Step C12) and the stream data having been transcoded is redistributed through the redistributing section 7A to the reproducing device 19 and operations are terminated (Step C14).

Due to operations described above, same programs each having a different decryption key are recorded in the decrypted stream data recording section 23. Therefore, if a decryption key corresponding to decrypted stream data is available, a correctly decrypted program is reproduced. Moreover, if no decryption key corresponding to decrypted stream data is available, since data is newly decrypted by the decryption key obtained from a stream data receiving section 3, if the decryption key is correct, a decrypted program is reproduced and, if the decryption key is incorrect, a program having been not decrypted correctly is reproduced, thus enabling the correct collation of the key in an ordinary manner.

The flow of the video/audio recording and the flow of watching/listening, as in the case of the first exemplary embodiment, may be performed in parallel and, in this case, an amount of data to be processed by the decrypting section 21 and transcoding section 25 may be divided into data parts each having an appropriate size and the step of processing data for every file is not required. The mounting of the transcoding section 25 itself and the processing by the transcoding section 25 (Step C13) may be omitted. The demanded portions of the stream data out of the decrypted stream data stored in the decrypted stream data recording section 23 may be redistributed by omitting the encoding process corresponding to the reproducing device 19 and may be redistributed instead of the Step C13.

As described above, according to the second exemplary embodiment, the reproduction demand range information representing the range of stream data of the program that the user makes a request for reproduction is collated by the redistributing section 7A with record demand range information by the user and, based on results from the collation, only the newly decrypted data is appended to the decrypted stream data recording section 23 and, therefore, even if the program has been encrypted, the data is correctly recorded and distributed with minimal amounts of processing.

Third Exemplary Embodiment

Figure 6:
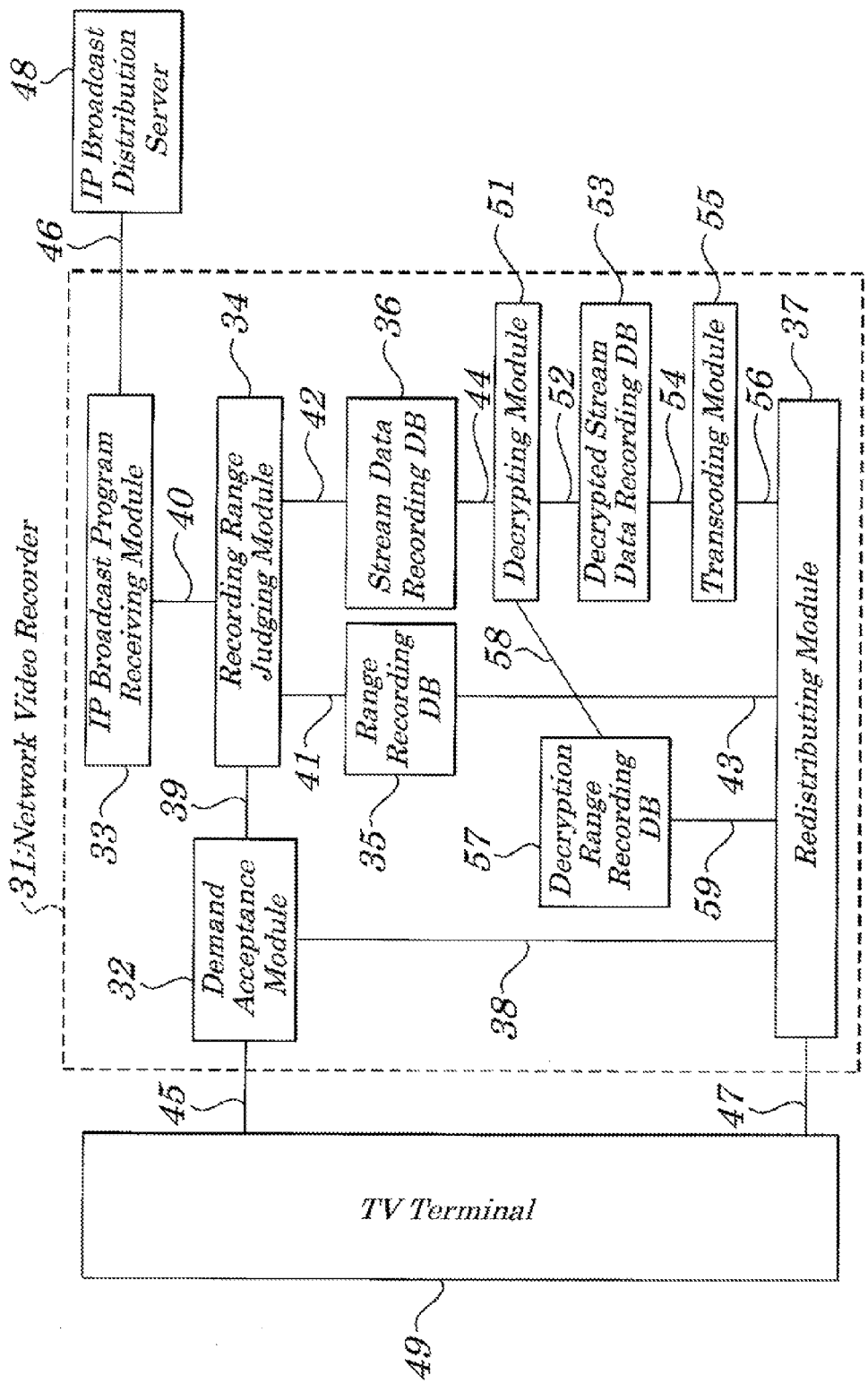
FIG. 6 is a block diagram showing electrical configurations of main components of a data recording device according to a third exemplary embodiment of the present invention.

FIG. 6 is a block diagram showing electrical configurations of main components of a data recording device of a third exemplary embodiment of the present invention. The data recording device of the third exemplary embodiment, as shown in FIG. 6, has a CPU 31a which is configured to be a network video recorder 31 and serves as a computer to control the entire network video recorder 31 and ROM 31b which is configured to store a data recording control program to operate the CPU 31a. Particularly, the network video recorder 31 is made up of a demand acceptance module 32, an IP (Internet Protocol) broadcast program receiving module 33, a recording range judging module 34, a range recording DB (Data Base) 35, a stream data recording DB 36, a redistributing module 37, a decrypting module 51, a decrypted stream data recording DB 53, a transcoding module 55, and a decryption range recording DB 57. The demand acceptance module 32 is connected through a communication path 38 to the redistributing module 37 and also through a communication path to the recording range judging module 34.

The IP broadcast program receiving module 33 is connected through a communication path 40 to the recording range judging module 34. The recording range judging module 34 is connected through a communication path 41 to the range recording DB 35 and also through a communication path 42 to the stream data recording DB. The range recording DB 35 is connected through a communication path 43 to the redistributing module 37. The stream data recording DB 36 is connected through a communication path 44 to the decrypting module 51. The decrypted stream data recording DB 53 is connected through a communication path 52 to the decrypting module 51. The decrypted stream data recording DB 53 is connected through a communication path 54 to the transcoding module 55. The transcoding module 55 is connected through a communication path 56 to the redistributing module 37. The decryption range recording DB 57 is connected through a communication path 58 to the decrypting module 51. The decryption range recording DB 57 is connected through a communication path 59 to the redistributing module 37.

The network video recorder 31 is connected through communication paths 45 and 47 to a TV terminal by the IP (Internet Protocol) and also a communication path 46 to an IP broadcast distribution server 48. Also, the IP broadcast distribution server 48 distributes a plurality of programs based on schedules on the IP. The programs are encoded according to the encoding method based on, for example, H.264 specifications and are encrypted with the key having received from a copyright managing server (not shown in any of figures). The TV terminal 49 receives the programs to reproduce them. The unillustrated program A to be explained later is two hours in length from starting of distribution from the IP broadcast distribution server 48 at PM 9:00 to ending of the distribution at PM 11:00 and has its screen size according to, for example, full Hi (High)-vision specifications (with horizontal width 1920 pixels×vertical width 1080 pixels).

Moreover, the IP broadcast program receiving module 33 has an unillustrated buffer being its maximum size of 100 Kbytes. It is now assumed that a video recording demand from the TV terminal 49 to be described later is the first demand made to the program A and, similarly, the reproduction demand from the TV terminal 49 is the first demand made to the program A. The TV terminal 49, when making a demand for watching of the program A to the demand acceptance module 32, obtains a decryption key from the unillustrated copyright managing server and, at the time of demand for the watching/listening, transfers the key together with the demand to the demand acceptance module 32. At this point of time, the TV terminal 49 transfers the information about the screen size being reproducible by the TV terminal 49 (for example, 1024 pixels in horizontal width by 768 pixels in vertical width) and about the encoding method (for example, MPEG-2) to the demand acceptance module 32.

Figure 7:
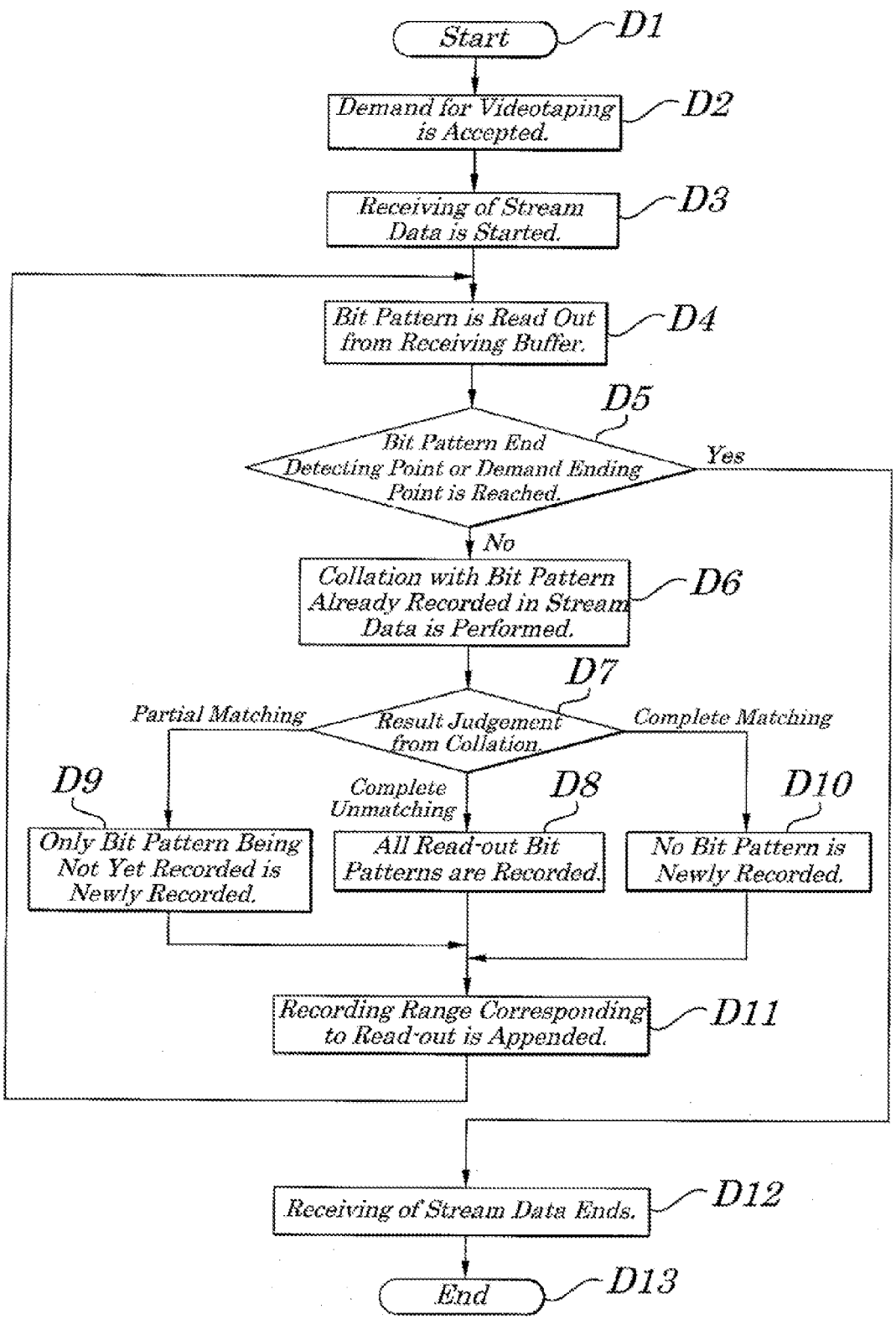
FIG. 7 is a flow chart explaining operations in video recording mode of a network video recorder 31 shown in FIG. 6.
Figure 8:
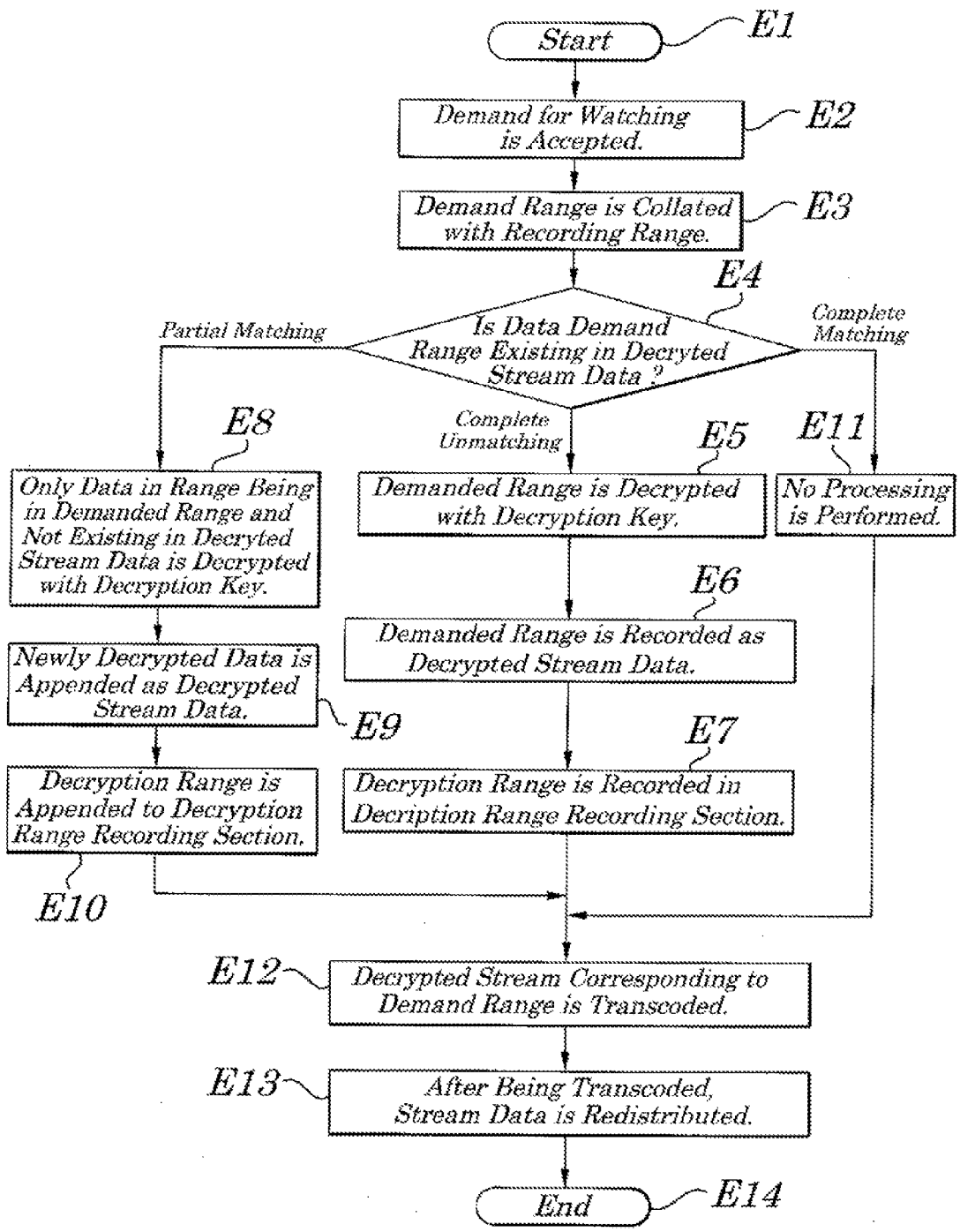
FIG. 8 is a flow chart explaining operations in watching mode of the network video recorder 31.

FIG. 7 is a flow chart explaining operations in video recording mode of a network video recorder 31 shown in FIG. 6; and FIG. 8 is a flow chart explaining operations in watching mode of the network video recorder 31. By referring to these drawings, contents of processing for data recording method to be used in the network video recorder 31 of the exemplary embodiment are explained. In the network video recorder 31, as shown in FIG. 7, at the time of video recording, when operations start (Step D1), the demand for one-hour video recording of the program beginning with its first portion out of the program A demanded by the TV terminal 49 is accepted by the demand acceptance module 32 and this demand is transferred to the recording range judging module 34 (Step D2). The recording range judging module 34 starts to receive, from the IP broadcast distributing server 48, the stream data of the program A to which demand for video recording is made to the IP broadcast program receiving module 33, based on the schedule of the start of broadcasting (Step D3). In the recording range judging module 34, a specified amount of newly receive data (which is also called a bit pattern according to the present exemplary embodiment) out of the stream data of the program A for which receiving has been started is read out from the unillustrated receiving buffer of the IP broadcast program receiving module 33 (Step D4). Then, when neither a bit pattern end detecting point nor a demand ending point is reached (Step D5), and, in the recording range judging module 34, the read-out bit pattern is collated with a previous program recorded in the stream data recording DB 36 (Steps D6 and D7) and, in this case, it is judged that, since the received program is a new one, there is no matching therebetween, and all the read-out bit patterns are newly recorded in the stream data recording DB 36 (Step D8).

Next, the recording range corresponding to the bit pattern read out from the receiving buffer is appended, as a record of performance of video/audio recording by a user, to the range recording DB 35 in a manner to be associated with a user identifier to identify the user. The processes from the above Step D4 to Step D11 are repeated (Step 5) until the ending point of the video/audio video recording range (hereinafter may be referred to as recording range) is reached (in terms of time or frame) after the elapse of one hour beginning with its first portion to be recorded and until no bit patterns to be read out are left and, when conditions are then satisfied, the receiving of stream data is terminated (Step D12) and operations end (Step D13).

The case where, in the above operational flow, a second TV terminal (not shown) having the function equivalent to the TV terminal 49 is connected to the network video recorder 31 is described hereinafter. It is assumed that there is a demand, for example, for 1.5 hours video recording from the commencement of the program to its ending. At this time, since the video recording for 1 hour since the commencement of the program has been completed based on the demand from the TV terminal 49, as the result from the judgment at the Step D7, the processing in the Step D10 for the demand for the 1.5 hours video recording since the commencement of the program is performed, thus resulting in no new recording and, at the Step D11, the corresponding recording range (video recording for 1 hour from the commencement to the ending point) is recorded in a manner to be associated with this user. Then, for the range, of time of 1 hour to 1.5 hour later, the same processing as in the Step D11 is performed and bit patterns are recorded in the stream data recording DB 36 and, at the Step D11, the corresponding recording time range (for 1 hour to 1.5 hours from the commencement of the program) is recorded in a manner to be associated with this user. Moreover, due to limitations imposed on the buffer capacity, if the bit pattern existing after the time lapse of 1 hour or so includes both the bit pattern portion before 1 hour and the pattern portion existing 1 hour later, the bit pattern is considered as the case where there is partial matching and, therefore, the same processing as in the Step D9 is performed and the portion existing for the time exceeding 1 hour since the commencement of the program is newly recorded in the stream data recording DB.

Furthermore, as shown in FIG. 8, at time of watching/listening, when operations start (Step E1), the demand for watching/listening to, for example, the program A (for example, for 2 hours from its commencement to its ending point) from the TV terminal 49 is accepted by the demand acceptance module and, then, this demand and the key for decryption are transferred to the redistributing module 37 (Step E2). In the redistributing module 37, based on recorded contents of the range recording DB 35, a recording range of the program A for which a user makes a request is checked (Step E3) and only the reproduction demand in the corresponding range (for example, the recording time range of 1 hour from the commencement of the program A to its ending point) is accepted and the key is stored in the decryption range recording DB 57 and succeeding processes are performed. Hereinafter, the demand range is limited to the range (for 1 hour from the commencement of the program to its ending point) accepted in the Step E3.

In the redistributing module 37, by making an inquiry of the decryption range recording DB 57, whether or not the stream data corresponding to the recording range of 1 hour from the commencement of the program A to its ending point is recorded, as the decrypted stream data stored in the decrypted stream data recording DB 53, is checked (Step E4). Since the demand for watching/listening is made on the program A for the first time after being recorded in the stream data recording DB 36, it is judged, at the Step E4, according to the recorded information of the decryption range recording DB 57 that there exists no decrypted stream data at all and stream data is obtained by the decrypting module 51 from the stream data recording DB 36 and then the decryption key for the program A is obtained for decryption (Step E5). The decrypted data is once stored in the decrypted stream data recording DB 53 (Step E6) and the decrypted range is stored in the decryption range recording DB 57 in a manner to be associated with the decrypted stream data of the program A (Step E7).

Next, the format of the decrypted stream data corresponding to the demand range is transcoded to a MPEG-2 encoding format being reproducible by the TV terminal 49 to which demand for watching/listening has been made and to a form having a screen size (1024 pixels in horizontal width by 768 pixels in vertical width) (Step E12) and the transcoded stream data of the program A is redistributed through the redistributing module 37 to the TV terminal (Step E13) and operations end (Step E14).

Operations of the case where a second TV terminal (not shown) is connected to the network video recorder 31 having functions equivalent to the TV terminal 49 are further described. That is, the second TV terminal has H.264 specifications as a reproducible encoding format with its screen size of horizontal width 1920 pixels×vertical width 1080 pixels and its video recording range is for 1.5 hour from the commencement of the program to its ending point and the decryption key is kept unchanged and the same as used in the processing by the TV terminal 49. For the range of the video recording of 1 hour from the commencement of the program to its ending point, the decrypted stream data is already recorded in the decrypted stream data recording DB 53 in the processing by the TV terminal 49, however, for the range of the video recording time of 1 hour to 1.5 hours, no record exists and, therefore, data corresponding to the range not existing in the decrypted stream data is decrypted newly with a decryption key (Step E8). The newly decrypted stream data is appended as decrypted stream data, to the decrypted stream data recording DB 53 (Step E9). Then, newly decrypted range is appended in the decryption range recording DB 57 (Step E10). In the Step E4, when the demand range is contained in the decrypted stream data (complete matching), no processing is performed in this step (Step E11).

Next, the decrypted stream data corresponding to the demand range is transcoded by the transcoding module 55 to the H.264 encoding format being reproducible in the TV terminal on which the demand for watching/listening is made and which has its screen size of horizontal width 640 pixels× vertical width 480 pixels (Step E12) and the transcoded stream data of the program A is redistributed through the redistributing module 37 to the TV terminal (Step E13) and operations end (Step E14).

As described above, according to the third exemplary embodiment, the stream-type program is redistributed by the network video recorder 31 without imposing loads proportional to the number of users on the stream data recording DB 36 and only the recording range set by a user is correctly redistributed and, therefore, even if the program has been encrypted, the data is correctly recorded and distributed with minimal amounts of processing.

Thus, the exemplary embodiments of the present invention have been described by referring to drawings, While the invention has been particularly shown and described with reference to exemplary embodiments thereof, the invention is not limited to these exemplary embodiments. For example, the present invention can be applied to program data other than stream data.

INDUSTRIAL APPLICABILITY

The present invention can be applied to recording and reproducing stream data used in such as digital broadcast and/or IPTV service.

The invention claimed is:

1. A data recording device having a program data recording unit for recording program stream data to be distributed through a network, comprising:
   a program data collating and appending unit to collate distributed program stream data in response to a later request for recording which one user has made with recorded program stream data already recorded successfully in said program data recording unit in response to an earlier request for recording which another user has made and to append, based on results from the collation, only newly distributed program stream data to said program data recording unit, said later request being independent of said earlier request; and
   a demand range recording unit to record recording demand range information representing a range of said program stream data that a user makes a request for recording and to record user information to identify said user in a manner to be associated with said record demand range information, said user information which is used, at time of redistribution, for judging as to whether or not said user has an authority to watch/listen to said range of said program stream data, and
   wherein said program data collating and appending unit reads out sequentially said distributed program stream data by specified amount from a receiving buffer, collates the specified amount of data having been sequentially read out, with said recorded program stream data, and appends only at least one chopped portion in which no recording range is duplicated therebetween, out of said distributed program stream data to said program data recording unit.

2. The data recording device according to claim 1, further comprising a redistributing unit which reads out, from said program data recording unit, program stream data as a range which said user has the authority to watch/listen to, only in a range corresponding to said recording demand range information of said user being recorded in said demand range recording unit and to redistribute the read-out program stream data to said user.

3. The data recording device according to claim 1, further comprising a decrypting unit to decrypt said program stream data, when said program stream data recorded in said program recording unit is encrypted, with a given decryption key;
   a decrypted data recording unit to record decrypted program stream data decrypted by said decrypting unit; and
   a decrypted data collating and appending unit to collate reproduction demand range information representing a range of said program stream data that said user makes a request for reproducing with said record demand range information being recorded in said demand range recording unit and to append, based on results from the collation, only newly decrypted program stream data to said decrypted data recording unit.

4. The data recording device according to claim 3, further comprising a redistributing unit to read out, from said decrypted data recording unit, said decrypted program stream data only in a range corresponding to said reproduction demand range information.

5. The data recording device according to claim 4, further comprising a reproduction range recording unit to provide said decryption key to said decryption unit and to record a range of said decrypted program stream data decrypted by said decryption unit in a manner to be associated with said decrypted program stream data.

6. A data recording method to be used in a data recording device having a program data recording unit for recording program stream data to be distributed through a network in said program data recording unit, comprising:
   program data collating and appending processing of collating distributed program stream data in response to a later request for recording which one user has made with recorded program stream data already recorded successfully in said data recording unit in response to an earlier request for recording which another user has made and of appending, based on results from the collation, only newly distributed program stream data to said program data recording unit, said later request being independent of said earlier request; and
   demand range recording processing of recording record demand range information representing a range of said program stream data that a user makes a request for recording and of recording user information to identify said user in a manner to be associated with said record demand range information, said user information which is used, at time of redistribution, for judging as to whether or not said user has an authority to watch/listen to said range of said program stream data, and
   wherein, in said program data collating and appending processing, said distributed program stream data is sequentially read out by specified amount from receiving buffer, and the specified amount of data having been sequentially read out is collated with said recorded with said recorded program stream data and only at least one chopped portion in which no recording range is duplicated therebetween, out of said distributed program stream data, is appended to said program data recording unit.

7. The data recording method according to claim 6, further comprising a redistributing processing of reading out, from said program data recording unit, program stream data as a range which said user has the authority to watch/listen to, only in a range corresponding to said recording demand range information of said user already recorded by said demand range recording processing and of redistributing said program stream data to said user.

8. The data recording method according to claim 6, further comprising a decrypting unit to decrypt said program stream data, when said stream data recorded in said program recording unit is encrypted, with a given decryption key;

- a decrypted data recording unit to record decrypted program stream data decrypted with said decrypting unit; and
- a decrypted data collating and appending unit to collate reproduction demand range information representing a range of said program stream data that said user makes a request for reproducing with said recording demand range information being recorded in said demand range recording unit and to append, based on results from the collation, only newly decrypted program stream data to said decrypted data recording unit.

9. The data recording method according to claim 8, further comprising redistributing processing of reading out, from said decrypted data recording unit, decrypted program stream data only in a range corresponding to said reproduction demand range information and of redistributing said decrypted program stream data to said user.

10. The data recording method according to claim 9, further comprising a decryption range record processing of providing said decryption key to said decrypted unit and of recording a range of said decrypted program stream data decrypted by said decrypting unit in a manner to be associated with said decrypted program stream data.

11. A data record controlling computer program stored in a non-transitory computer-readable storage medium for making a computer function as a data recording device having a program data recording unit for recording program stream data to be distributed through a network, comprising:

- a program data collating and appending unit to collate distributed program stream data in response to a later request for recording which one user has made with recorded program stream data already recorded successfully in said program data recording unit in response to an earlier request for recording which another user has made and to append, based on results from the collation, only newly distributed program stream data to said program data recording unit, said later request being independent of said earlier request; and
- a demand range recording unit to record recording demand range information representing a range of said program stream data that a user makes a request for recording and to record user information to identify said user in a manner to be associated with said record demand range information, said user information which is used, at time of redistribution, for judging as to whether or not said user has an authority to watch/listen to said range of said program stream data, and wherein said program data collating and appending unit reads out sequentially said distributed program stream data by specified amount from a receiving buffer, collates the specified amount of data having been sequentially read out with said recorded program stream data and appends only at least one chopped portion in which no recording range is duplicated therebetween, out of said distributed program stream data to said program data recording unit.

\* \* \* \* \*